US012103316B2

(12) United States Patent
Umeda et al.

(10) Patent No.: US 12,103,316 B2
(45) Date of Patent: Oct. 1, 2024

(54) IMAGE FORMING APPARATUS, LIFETIME DETERMINATION METHOD AND NON-TRANSITORY COMPUTER-READABLE RECORDING MEDIUM STORING LIFETIME DETERMINATION PROGRAM

(71) Applicant: KONICA MINOLTA, INC., Tokyo (JP)

(72) Inventors: Katsuhiro Umeda, Tokyo (JP); Yusuke Nishisaka, Tokyo (JP); Hiroshi Akita, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 183 days.

(21) Appl. No.: 18/061,587

(22) Filed: Dec. 5, 2022

(65) Prior Publication Data

US 2023/0173822 A1 Jun. 8, 2023

(30) Foreign Application Priority Data

Dec. 7, 2021 (JP) ................................ 2021-198390

(51) Int. Cl.
*B41J 29/393* (2006.01)
*B41J 2/14* (2006.01)
*B41J 2/195* (2006.01)

(52) U.S. Cl.
CPC ........... *B41J 2/195* (2013.01); *B41J 2/14233* (2013.01); *B41J 29/393* (2013.01); *B41J 2029/3935* (2013.01)

(58) Field of Classification Search
CPC .. B41J 29/38; B41J 29/393; B41J 2029/3935; B41J 2/2139; B41J 2/2142
See application file for complete search history.

(56) References Cited

U.S. PATENT DOCUMENTS

2006/0244795 A1* 11/2006 Hayasaki ............. B41J 2/17566 347/86
2013/0113855 A1* 5/2013 Steurrys ................. B41J 2/0451 347/14

FOREIGN PATENT DOCUMENTS

JP 2001239658 A * 9/2001 .......... B41J 2/04508
JP 2014069311 A 4/2014

OTHER PUBLICATIONS

Kawatoko, MachineTranslationofJP-2001239658-A, 2001 (Year: 2001).*

* cited by examiner

*Primary Examiner* — Scott A Richmond
(74) *Attorney, Agent, or Firm* — BUCHANAN, INGERSOLL & ROONEY PC

(57) ABSTRACT

An image forming apparatus includes: an ink-jet head including a storage that stores phase transition ink, the ink-jet head forms an image on a recording medium by ejecting the phase transition ink; and one or more hardware processors. The one or more hardware processors change a driving condition of the ink-jet head for a case of ejecting the phase transition ink on a basis of a first reading result of a pattern image formed by the ink-jet head; estimate occurrence of a state change of the phase transition ink in the storage when the driving condition that is changed satisfies a predetermined condition; and determine whether a lifetime of the ink-jet head is over in accordance with whether the occurrence of the state change is estimated.

16 Claims, 6 Drawing Sheets

IMAGE FORMING APPARATUS, LIFETIME DETERMINATION METHOD AND NON-TRANSITORY COMPUTER-READABLE RECORDING MEDIUM STORING LIFETIME DETERMINATION PROGRAM

CROSS REFERENCE TO RELATED APPLICATIONS

The entire disclosure of Japanese Patent Application No. 2021-198390 filed on Dec. 7, 2021 is incorporated herein by reference in its entirety.

BACKGROUND

Technological Field

The present invention relates to an image forming apparatus, a lifetime determination method and a non-transitory computer-readable recording medium storing a lifetime determination program.

Description of Related Art

Image forming apparatuses of an ink-jet type (hereinafter referred to as ink-jet image forming apparatuses) that eject ink onto a recording medium such as a sheet to form an image on the recording medium are known. In an ink-jet image forming apparatus, the quality of the formed image changes due to deterioration of an ink-jet head for ejecting ink (hereinafter referred to simply as head) over time. For example, the head includes a piezoelectric element for ejecting ink, and the ink ejection amount and the quality (density) of the formed image are reduced due to the deterioration of the piezoelectric element over time.

In view of this, to maintain the quality of the formed image, the known ink-jet image forming apparatuses adjust the driving condition for the head (such as the driving voltage applied to the piezoelectric element) such that the ink ejection amount is appropriate.

Further, in the case where an appropriate ink ejection amount cannot be obtained even by adjusting the driving condition for the head, known ink-jet image forming apparatuses determine the lifetime of the head is over, and replace it with a new head. For example, Japanese Patent Application Laid-Open No. 2014-69311 discloses an ink-jet image forming apparatus that estimates and determines the lifetime of the head by determining the change of the driving condition for the head.

Incidentally, inks ejected from the head include gel inks (phase transition inks) containing a gel component that undergoes a reversible sol-gel phase transition upon temperature change. In ink-jet image forming apparatuses using gel inks, the concentration of the gel component of the gel ink stored in the storage unit in the head may be increased depending on the use condition. If the gel ink in such a state is ejected to the head, the gel ink with high concentration of the gel component does not spread to a predetermined dot diameter because of the increased pinning property. Therefore, to maintain the quality of the formed image, it is necessary to adjust the driving condition for the head.

Even in the case where the driving condition for the head is adjusted because of a change of the concentration of the gel component of the gel ink, not deterioration of the head over time, a known ink-jet image forming apparatus as that disclosed in PTL 1 estimates and determines the lifetime of the head on the basis of the change of the driving condition for the head. Consequently, there is a risk of determining that the lifetime of the head is over even when the lifetime of the head is not over, on the basis of the change of the driving condition for the head due to a change of the concentration of the gel component of the gel ink. If such a determination is made, replacement with a new head is performed more than necessary even when the lifetime of the head is not over, thus resulting in cost increase.

SUMMARY

An object of the present invention is to provide an image forming apparatus, a lifetime determination method and a non-transitory computer-readable recording medium storing a lifetime determination program that can accurately determine the lifetime of an ink-jet head.

To achieve the abovementioned object, an image forming apparatus reflecting one aspect of the present invention includes: an ink-jet head including a storage that stores phase transition ink, the ink-jet head forms an image on a recording medium by ejecting the phase transition ink; and one or more hardware processors. The one or more hardware processors change a driving condition of the ink-jet head for a case of ejecting the phase transition ink on a basis of a first reading result of a pattern image formed by the ink-jet head; estimate occurrence of a state change of the phase transition ink in the storage when the driving condition that is changed satisfies a predetermined condition; and determine whether a lifetime of the ink-jet head is over in accordance with whether the occurrence of the state change is estimated.

To achieve the abovementioned object, a lifetime determination method reflecting one aspect of the present invention includes: forming a pattern image on a recording medium by ejecting a phase transition ink from an ink-jet head including a storage that stores the phase transition ink; changing a driving condition of the ink-jet head for a case of ejecting the phase transition ink on a basis of a first reading result of the pattern image that is formed; estimating occurrence of a state change of the phase transition ink in the storage when the driving condition that is changed satisfies a predetermined condition; and determining whether a lifetime of the ink-jet head is over in accordance with whether the occurrence of the state change is estimated.

To achieve the abovementioned object, a non-transitory computer-readable recording medium storing a lifetime determination program reflecting one aspect of the present invention causes a computer to perform a process of forming a pattern image on a recording medium by ejecting a phase transition ink from an ink-jet head including a storage that stores the phase transition ink; a process of changing a driving condition of the ink-jet head for a case of ejecting the phase transition ink on a basis of a first reading result of the pattern image that is formed; a process of estimating occurrence of a state change of the phase transition ink in the storage when the driving condition that is changed satisfies a predetermined condition; and a process of determining whether a lifetime of the ink-jet head is over in accordance with whether the occurrence of the state change is estimated.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Embodiments of the present invention are elaborated below with reference to the accompanying drawings.

Image Forming Apparatus

Figure 1:
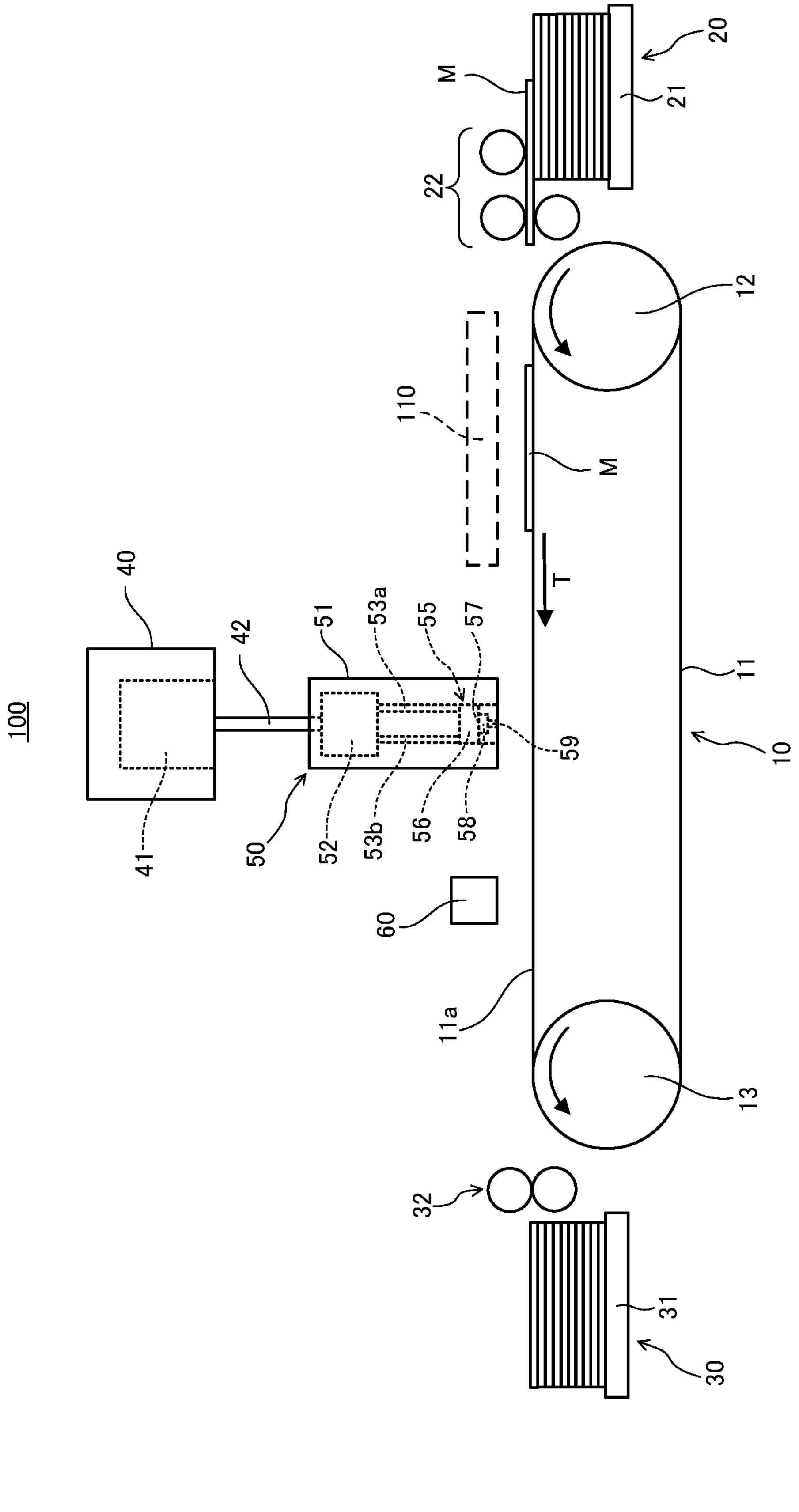
FIG. 1 is a diagram illustrating a schematic configuration of an image forming apparatus according to an embodiment of the present invention.
Figure 2:
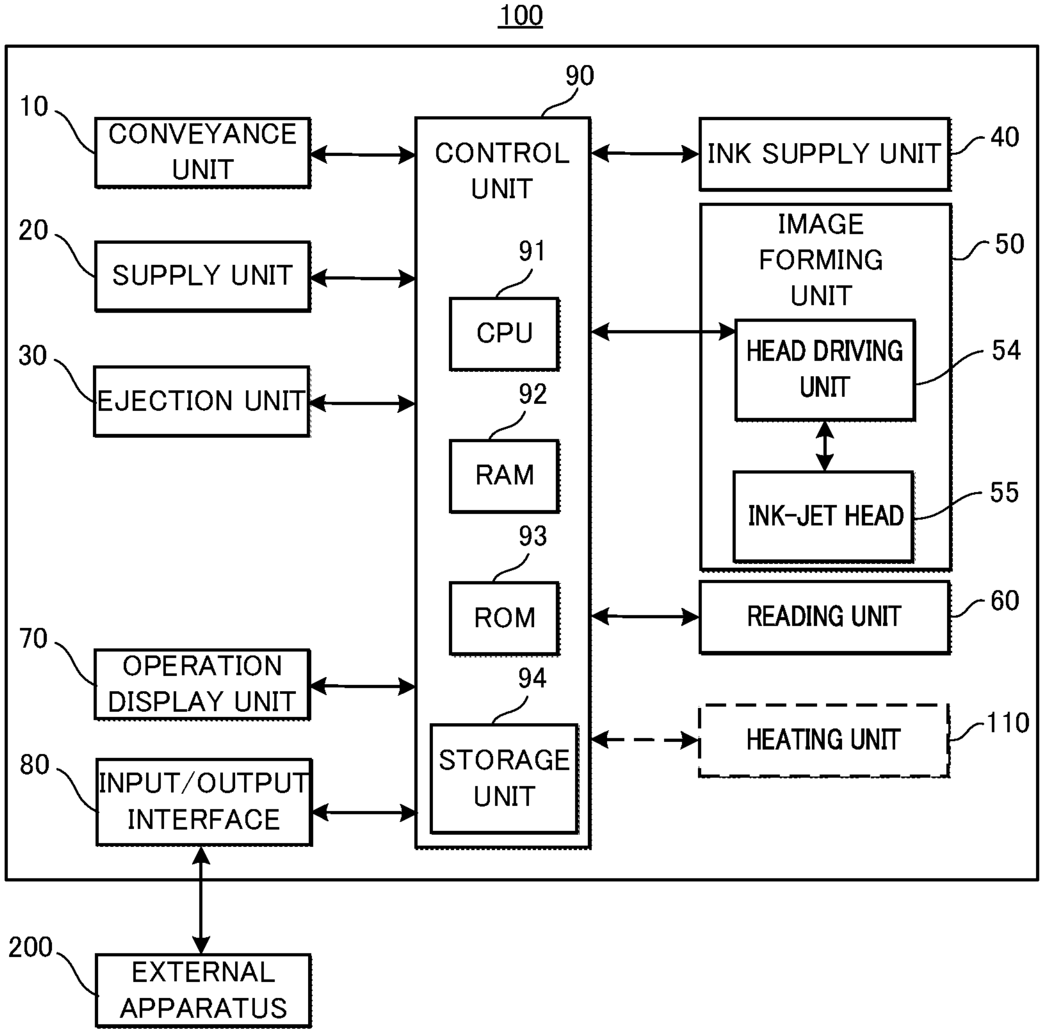
FIG. 2 is a block diagram illustrating a main part of a control system of the image forming apparatus illustrated in FIG. 1.

FIG. 1 is a diagram illustrating a schematic configuration of ink-jet printer 100 according to the present embodiment (in the present invention, an image forming apparatus). FIG. 2 is a block diagram illustrating a main part of a control system of ink-jet printer 100.

As illustrated in FIG. 1 and FIG. 2, ink-jet printer 100 includes conveyance unit 10, supply unit 20, ejection unit 30, ink supply unit 40, image forming unit 50, reading unit 60, operation display unit 70, input/output interface 80, control unit 90 and the like.

Conveyance unit 10 includes a plurality of members for conveyance such as conveyance belt 11, driving roller 12 and driven roller 13. Conveyance unit 10 conveys recording medium M through a conveyance operation of a plurality of members such as conveyance belt 11. More specifically, in conveyance unit 10, conveyance belt 11 is stretched around driving roller 12 and driven roller 13, and driven when driving roller 12 is driven into rotation. In this manner, recording medium M supplied from supply unit 20 is conveyed to image forming unit 50 in the state where it is placed on conveyance surface 11*a* of conveyance belt 11, and conveyed to ejection unit 30 after being subjected to image formation (printing) at image forming unit 50.

As recording medium M, various media that can fix the ink ejected from ink-jet head 55 described later may be used, and examples of recording medium M include media such as sheet-shaped paper, cloth (fabric), and resin. Note that recording medium M is not limited to a sheet-shaped medium, and may be roll-shaped paper, cloth, resin or the like.

In addition, while conveyance unit 10 that conveys recording medium M with conveyance belt 11 is described here as an example, conveyance belt 11 is not limitative, and conveyance unit 10 may be configured to convey recording medium M with drums and/or rollers.

Supply unit 20 includes supply loading unit 21 that loads and stores a plurality of recording media M, conveyance unit 22 that conveys and supplies recording medium M from supply loading unit 21 to conveyance unit 10, and the like. Supply loading unit 21 is configured to be vertically movable, and when the topmost recording medium M is conveyed by supply conveyance unit 22 to conveyance unit 10, supply loading unit 21 moves up so that the next topmost recording medium M after the conveyance can be conveyed by supply conveyance unit 22.

Ejection unit 30 includes ejection loading unit 31 that loads and stores a plurality of recording media M, ejection conveyance unit 32 that conveys recording medium M ejected from conveyance unit 10 to ejection loading unit 31, and the like. Ejection loading unit 31 is configured to be vertically movable, and when recording medium M is conveyed from ejection conveyance unit 32 to ejection loading unit 31, ejection loading unit 31 moves down.

Supply conveyance unit 22 and ejection conveyance unit 32 include a plurality of rollers, and convey recording medium M by rotating the rollers, for example. Supply conveyance unit 22 and ejection conveyance unit 32 are not limited to the roller, and may be composed of a belt or a combination of a belt and a roller.

Note that in the case where a roll-shaped medium is used as recording medium M, an unwinding roller where a roll-shaped medium is stored in a wound state and a winding roller that winds up the roll-shaped medium are used instead of supply loading unit 21 and ejection loading unit 31. The roll-shaped medium is conveyed to conveyance unit 10 by rotating the unwinding roller, and is wound around the winding roller by rotating the winding roller.

In addition, a post-processing device that performs a post-processing on recording medium M on which an image has been formed at image forming unit 50 may be provided between conveyance unit 10 and ejection unit 30. An example of the post-processing device is a fixing device that fixes inks to recording medium M. In the case where an ultraviolet curable ink is used as the ink, a fixing device that fixes the ink to recording medium M by applying ultraviolet rays onto recording medium M is used, for example. In addition, in the case where water-based inks and/or solvent inks are used as the ink, a fixing device that fixes the ink to recording medium M by a method such as drying is used, for example. In addition, as the post-processing device, devices other than fixing devices, such as a cutting device that cuts recording medium M into a desired length and the like, may be used.

Ink supply unit 40 is a device that supplies ink to sub-tank 52 of image forming unit 50 described later, and includes main tank 41 and members related to ink supply omitted in the drawings (such as a pump and a valve). Main tank 41 stores ink to be supplied to sub-tank 52 at room temperature.

Ink supply unit 40 supplies ink from main tank 41 to sub-tank 52 through channel 42 by using a pump and the like (omitted in the drawing).

In the present embodiment, as the ink, a gel ink (phase transition ink) containing wax as a gel component that undergoes a reversible sol-gel phase transition upon temperature change is used. For example, an energy ray-curable gel ink (such as a UV-curable gel ink as an example) that is gel at room temperature and sol at a temperature above the heated phase transition temperature, and cures when irradiated with an energy ray can be used.

Image forming unit 50 includes carriage 51, sub-tank 52, channels 53*a* and 53*b*, head driving unit 54, ink-jet head (hereinafter referred to simply as head) 55 and the like (see FIG. 1 and FIG. 2).

Note that while FIG. 1 illustrates ink supply unit 40 and image forming unit 50 for a single color for the sake of simplifying the drawing, ink supply unit 40 and image forming unit 50 are disposed in accordance with the number of colors used. For example, in the case where four colors of yellow (Y), magenta (M), cyan (C), black (K) are used, supply units 40 and image forming units 50 for the inks of the four colors are disposed, and image forming units 50 are disposed side by side at a predetermined interval along the conveyance direction T.

Carriage 51 is a housing for internally holding sub-tank 52, channels 53*a* and 53*b*, head driving unit 54, head 55, devices and members required for image formation and the like. In addition, although not illustrated in the drawings, carriage 51 includes an ink heating unit for heating the gel ink inside carriage 51 to a temperature equal to or higher than the phase transition temperature of the gel component of the gel ink, and maintaining it.

Sub-tank 52 (in the present invention, a storage unit) stores the gel ink supplied from main tank 41 in carriage 51. The gel ink in sub-tank 52 is supplied to manifold 56 described later of head 55 through channel 53*a* by using the pump and the like (omitted in the drawing) in carriage 51. In addition, the gel ink supplied to manifold 56 is circulated to sub-tank 52 through channel 53*b*. That is, channels 53*a* and 53*b* form a circulation channel that circulates gel ink between sub-tank 52 and manifold 56.

Under the control of control unit 90 described later, head driving unit 54 outputs a driving voltage corresponding to the image to be formed to piezoelectric element 58 of head 55 described later. Piezoelectric element 58 is driven with the driving voltage from head driving unit 54, and gel ink of the amount corresponding to the image data is ejected from nozzle 59 of head 55 described later.

Head 55 includes manifold 56, pressure chamber 57, piezoelectric element 58, nozzle 59 and the like. Head 55 includes a plurality of nozzles 59, and pressure chamber 57 and piezoelectric element 58 corresponding to the number of nozzles 59 are provided.

Manifold 56 is communicated with a plurality of pressure chambers 57, and the gel ink supplied to manifold 56 is supplied to pressure chamber 57. Pressure chamber 57 is a space for storing gel ink to be ejected, and piezoelectric element 58 is provided at its wall surface. In addition, one end of nozzle 59 is communicated with pressure chamber 57, and the other end is an open end.

A driving voltage from head driving unit 54 is applied to piezoelectric element 58. When the driving voltage from head driving unit 54 is applied to piezoelectric element 58, piezoelectric element 58 deforms in accordance with applied driving voltage, and pressure chamber 57 deforms. The deformation of pressure chamber 57 applies a pressure change to the gel ink in pressure chamber 57 to be supplied to nozzle 59.

Accordingly, when the driving voltage from head driving unit 54 is applied to piezoelectric element 58, piezoelectric element 58 and pressure chamber 57 deform to apply the pressure change to the gel ink in pressure chamber 57, and as a result the gel ink in pressure chamber 57 is ejected from nozzle 59. By ejecting the gel ink from nozzle 59 in this manner, an image can be formed on recording medium M being conveyed.

In carriage 51, head 55 may be configured as a single path (one path) type that forms an image through a single scan, or as a scan (multiple path) type that forms an image through multiple scans. In the case of the single path type, a number of heads 55 corresponding to the image formation width are disposed in the width direction of recording medium M (the direction orthogonal to conveyance direction T of recording medium M) in carriage 51.

Reading unit 60, which is disposed downstream of image forming unit 50 in conveyance direction T of recording medium M, reads the image (for example, an image of a predetermined pattern) formed on recording medium M conveyed by conveyance belt 11. Reading unit 60 outputs the reading result of the image of a predetermined pattern to control unit 90. On the basis of the reading result, control unit 90 changes the image formation condition such as the image formation position and the driving condition of head 55.

In addition, although not illustrated in the drawings, ink-jet printer 100 includes a maintenance unit that performs maintenance such as cleaning of head 55.

Operation display unit 70 is a flat panel display with a touch panel of liquid crystal, organic EL (Electro Luminescence) or the like. Operation display unit 70 displays an operation menu, information relating to the image data, various statuses of ink-jet printer 100 and the like for the user. In addition, operation display unit 70 includes a plurality of keys, and receives various inputting operations from the user.

Input/output interface 80 operates for data exchange between external apparatus 200 and control unit 90. Input/output interface 80 is composed of any of various serial interfaces, various parallel interfaces, or combinations of them, for example.

External apparatus 200 is a personal computer, a facsimile machine or the like, and supplies print jobs, image data and the like to control unit 90 through input/output interface 80, for example.

Control unit 90 includes one or more hardware processors. More specifically, control unit 90 includes Central Processing Unit (CPU) 91, random access memory (RAM) 92, read only memory (ROM) 93, storage unit 94 and the like.

CPU 91 reads various controlling programs and setting data stored in ROM 93, stores them in RAM 92, and performs various arithmetic processing by executing the program. For example, control unit 90 generates a driving signal of the image to be formed on the basis of image data received from input/output interface 80, and outputs it to head 55.

RAM 92 provides CPU 91 with a working memory space, and stores temporarily data. Note that RAM 92 may include a nonvolatile memory.

ROM 93 stores setting data and various controlling programs executed by CPU 91 and the like. Note that a rewritable nonvolatile memory such as an EEPROM (Electrically Erasable Programmable Read Only Memory) and a flash memory may be used instead of ROM 93.

Storage unit 94 stores a print job and image data according to a print job input from external apparatus 200 through input/output interface 80. A HDD (Hard Disk Drive) may be used as storage unit 94, and a DRAM (Dynamic Random Access Memory) and the like may also be used together, for example.

Conveyance unit 10, supply unit 20, ejection unit 30, ink supply unit 40, image forming unit 50, reading unit 60, operation display unit 70, input/output interface 80 and the like are connected to control unit 90. Control unit 90 comprehensively controls the entire operation of ink-jet printer 100. Conveyance unit 10, supply unit 20, ejection unit 30, ink supply unit 40, image forming unit 50, reading unit 60, operation display unit 70, input/output interface 80 and the like execute predetermined processes under the control of control unit 90.

Under the control of control unit 90, ink-jet printer 100 with the above-described configurations supplies recording medium M from supply unit 20 to conveyance unit 10, forms an image on recording medium M conveyed by conveyance unit 10 at image forming unit 50, and conveys recording medium M on which the image is formed to ejection unit 30.

In the present embodiment, control unit 90 changes the driving condition of head 55 in the case where gel ink is ejected on the basis of the first reading result described below, which is a reading result read at reading unit 60 (a driving condition change unit in the present invention). The driving condition change unit is provided as a function of control unit 90 and is provided as a program to be executed at control unit 90, for example.

Figure 3:
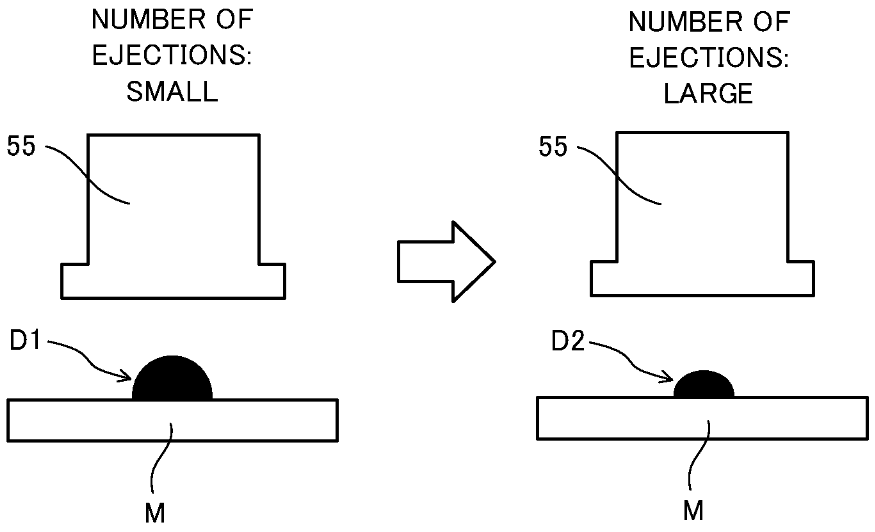
FIG. 3 is a diagram for describing a change of ink drops ejected from the ink-jet head in the case where the number of times of ejection (degree of degradation) of the ink-jet head differs.

Here, FIG. 3 is a diagram for describing a change of a droplet of gel ink ejected from head 55 in the case where the number of times of ejection (degree of degradation) of head 55 differs. In addition, FIG. 4 is a graph illustrating a relationship between the number of times of ejection of gel ink and an optimum driving voltage applied to piezoelectric element 58 of head 55.

The quality of the formed image changes due to deterioration of head 55 over time. For example, in head 55, due to deterioration of piezoelectric element 58 over time in accordance with the number of times of ejection, the ejection amount of the gel ink ejected from head 55 is reduced, the size of the droplet of the gel ink is reduced (see droplet D1→D2 illustrated in FIG. 3), and the quality (density) of the formed image is reduced.

In view of this, to maintain the quality of the formed image, control unit 90 (the driving condition change unit) adjusts the driving condition of head 55 on the basis of the first reading result so as to set an appropriate ejection amount of the gel ink. For example, an optimum voltage is obtained by adjusting the driving voltage to piezoelectric element 58 that is the driving condition of head 55 so as to set a gel ink ejection amount with which the formed pattern image is a reference pattern image, on the basis of the image density and the droplet dot diameter as the first reading result.

Figure 4:
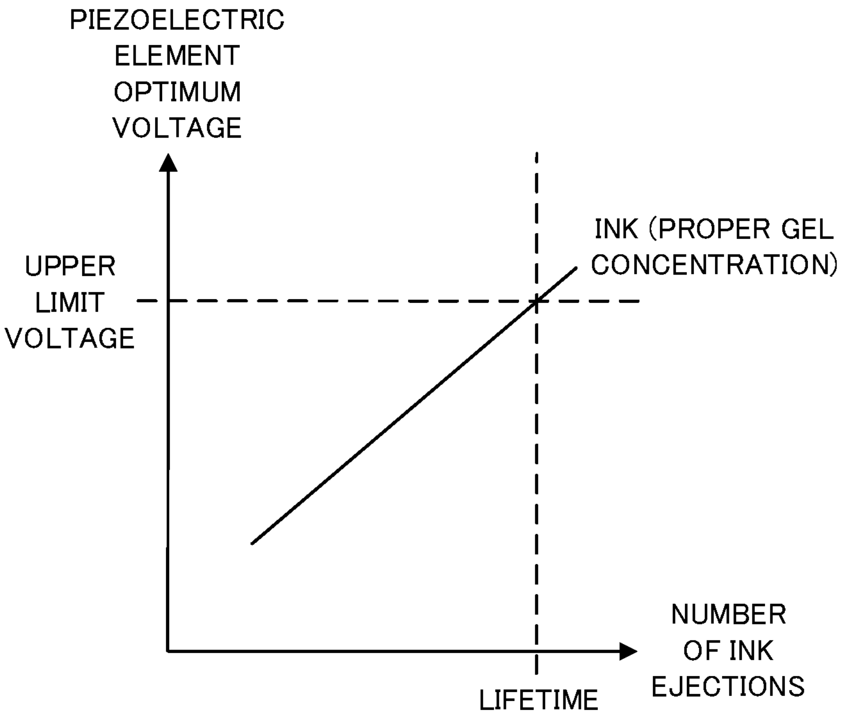
FIG. 4 is a graph illustrating a relationship between the number of times of ink ejection and an optimum voltage applied to the piezoelectric element of the ink-jet head.

Then, in the case where the driving condition of head 55 satisfies a predetermined condition, such as a case where the driving voltage of piezoelectric element 58 exceeds the upper limit voltage of the optimum voltage as illustrated in FIG. 4, an appropriate ejection amount of the gel ink cannot be ejected even by adjusting the driving voltage of piezoelectric element 58. In this case, it is determined that the lifetime of head 55 is over, and it is replaced with new head 55.

Incidentally, in the case of gel ink, the concentration of the gel component of the gel ink stored in sub-tank 52 in carriage 51 may be increased depending on the use condition.

Figure 5:
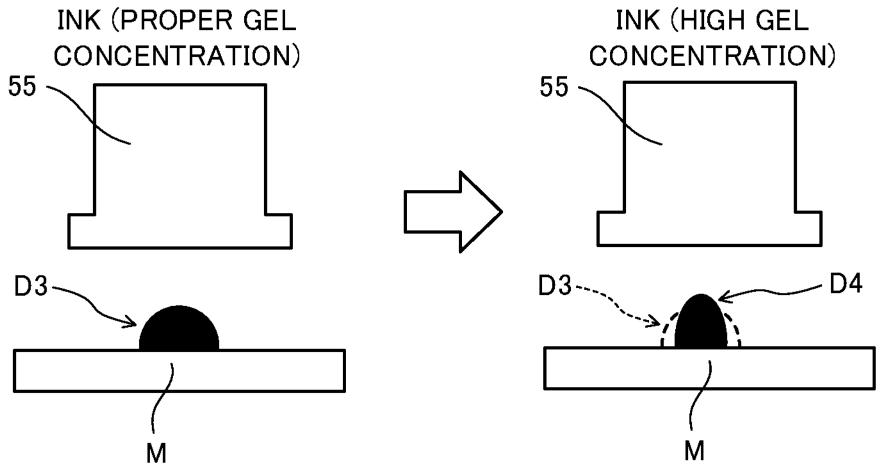
FIG. 5 is a diagram for describing a change of ink drops ejected from the ink-jet head in the case where the concentration of the gel component contained in the ink differs.
Figure 6:
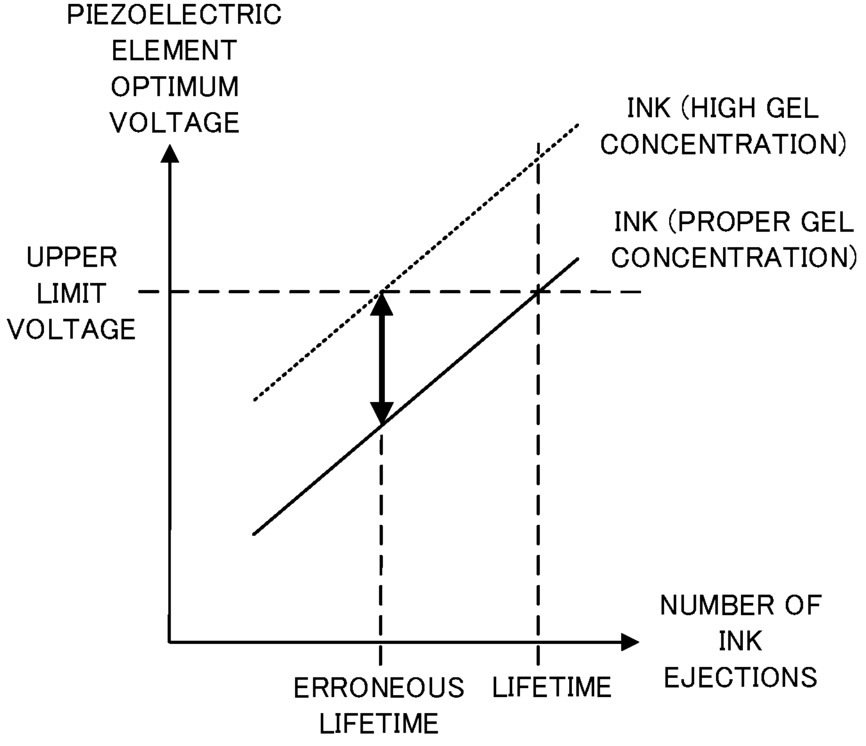
FIG. 6 is a graph illustrating a relationship between the number of times of ink ejection and an optimum voltage applied to the piezoelectric element of the ink-jet head, regarding an ink containing a gel component with a proper concentration and an ink containing a gel component with a high concentration.

Here, FIG. 5 is a diagram for describing a change of the droplet of the gel ink ejected from head 55 in the case where the concentration of the gel component contained in the gel ink differs. FIG. 6 is a graph illustrating a relationship between the number of times of ejection of gel ink and an optimum driving voltage applied to piezoelectric element 58 of head 55, regarding a gel ink containing a gel component with a proper concentration and a gel ink containing gel component with a high concentration (>proper concentration).

When the concentration of the gel component of the gel ink becomes high, its pinning property increases, and consequently the droplet of the gel ink ejected from head 55 does not spread to a predetermined dot diameter (see droplet D3→D4 illustrated in FIG. 5).

Therefore, to maintain the quality of the formed image, it is necessary to adjust the driving condition of head 55. More specifically, as described above, the driving condition of head 55 (for example, the driving voltage to piezoelectric element 58) is adjusted so as to set an appropriate ejection amount of the gel ink on the basis of the first reading result (image density and droplet dot diameter).

Even in the case where the driving condition of head 55 (the driving voltage of piezoelectric element 58) is adjusted because of a change of the concentration of the gel component of the gel ink as described above, the lifetime of the head is estimated and determined on the basis of a change of the driving condition of head 55 as illustrated in FIG. 6. Consequently, even when the lifetime of the head is not over, there is a risk of mistakenly determining that the lifetime of the head is over on the basis of the change of the driving condition of head 55 because of a change of the concentration of the gel component of the gel ink. If such a determination is made, unnecessary replacement with new head 55 is performed even when the lifetime of head 55 is not over, thus resulting in cost increase.

In view of this, in the present embodiment, ink-jet printer 100 includes a state change estimation unit and a determination unit described below. In the case where the driving condition of head 55 satisfies a predetermined condition, the state change estimation unit estimates that a state change of the gel ink in sub-tank 52 has occurred. In addition, the determination unit determines whether the lifetime of head 55 is over in accordance with whether it is estimated that a state change has occurred.

The state change estimation unit is provided as a function of control unit 90, and is provided as a program to be executed at control unit 90, for example. In the case where the driving condition of head 55 satisfies a predetermined condition, or more specifically, in the case where the upper limit voltage of piezoelectric element 58 exceeds an optimum voltage, the state change estimation unit estimates that a state change of the gel ink in sub-tank 52 has occurred. Regarding the estimation of occurrence of a state change of the gel ink in sub-tank 52, whether the concentration of the gel component of the gel ink is changed is determined on the basis of the use history of head 55 (the use period of head 55 and the number of times of ink ejection at head 55).

In addition, the determination unit is also provided as a function of control unit 90, and is provided as a program to be executed at control unit 90, for example. The determination unit determines whether the lifetime of head 55 is over in accordance with whether the state change estimation unit has estimated that a state change has occurred, that is, whether the concentration of the gel component of the gel ink is changed. In the case where the concentration of the gel component of the gel ink is changed, it is determined that the lifetime of head 55 is not over even when the optimum voltage of piezoelectric element 58 exceeds the upper limit voltage.

Figure 7:
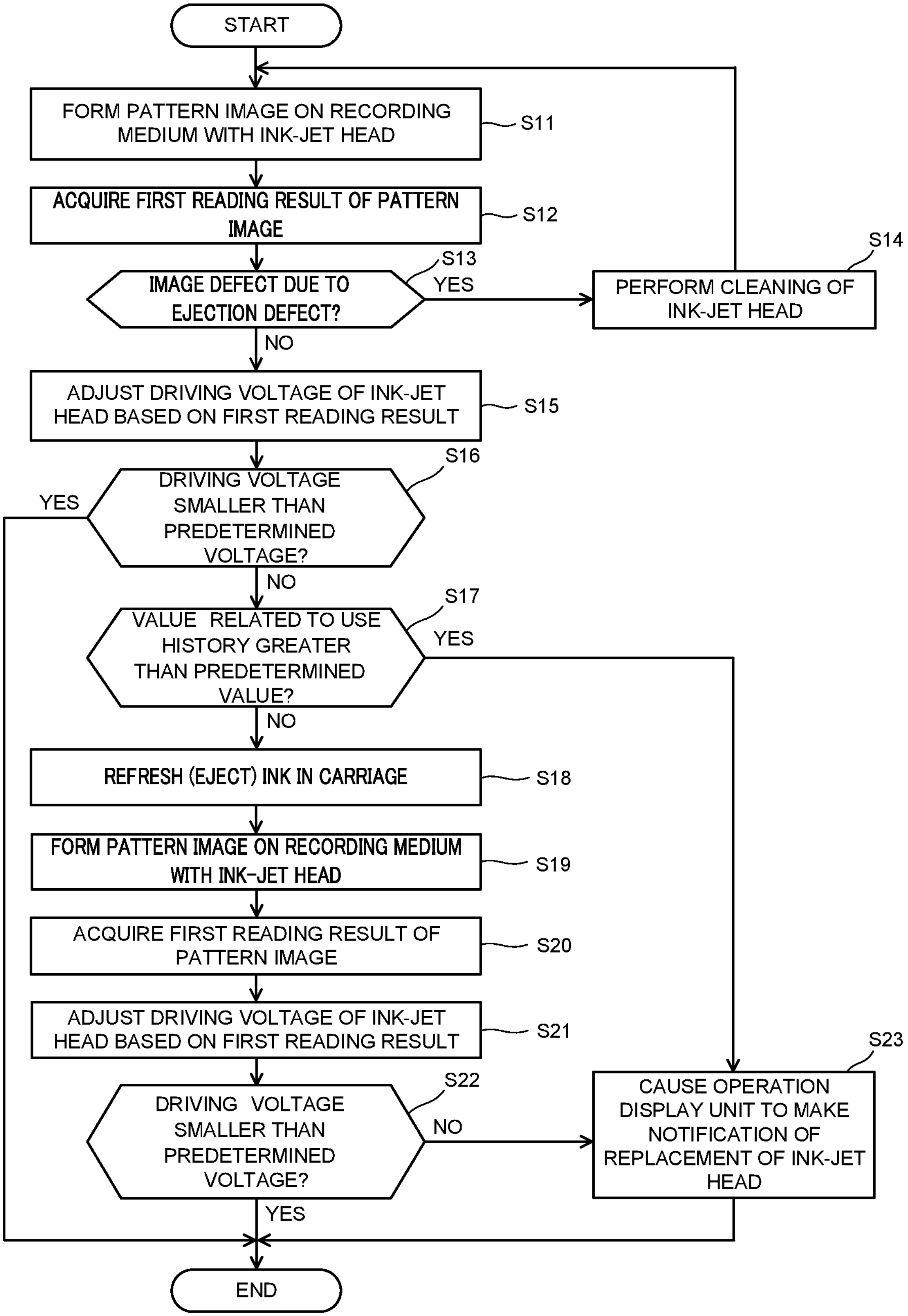
FIG. 7 is a flowchart for describing a lifetime determination method performed in the image forming apparatus illustrated in FIG. 1.

An example of the lifetime determination method for head 55 provided by ink-jet printer 100 including the above-described state change estimation unit and determination unit is described below with reference to FIG. 7. FIG. 7 is a flowchart for describing a lifetime determination method performed in ink-jet printer 100. The lifetime determination method illustrated in FIG. 7 is performed as a lifetime determination program in control unit 90 as a computer.

Step S11

Control unit 90 controls image forming unit 50 to form a pattern image on recording medium M with head 55. Since the image density and dot diameter are measured at reading unit 60 as described below, a dot pattern is used as the pattern image.

Step S12

By using reading unit 60, control unit 90 reads the pattern image formed on recording medium M and acquires the first reading result (the image density and the dot diameter).

Step S13

On the basis of the acquired first reading result (the image density and the dot diameter), control unit 90 determines whether there is an image defect due to an ejection defect of the gel ink. For example, in the case where the image density and/or the dot diameter of the dot pattern cannot be appropriately acquired and the like, it is determined that there is an image defect due to an ejection defect of the gel ink. When it is determined that there is an image defect (YES), the process proceeds to step S14, whereas when it is determined that there is no image defect (NO), the process proceeds to step S15.

Step S14

Control unit 90 performs cleaning of head 55 by using the maintenance unit. After the cleaning of head 55 is performed, the process is returned to step S11, and steps S11 to S13 are performed again. In the case where the cleaning is continuously performed predetermined times, control unit 90 may make notifications at operation display unit 70 in the form of error messages, sounds and the like, for example Step S15

On the basis of the acquired first reading result (the image density and the dot diameter), control unit 90 (the driving condition change unit) adjusts the driving condition of head 55 (the driving voltage of piezoelectric element 58). More specifically, on the basis of the image density and the dot diameter, the driving voltage of piezoelectric element 58 is adjusted so as to set the gel ink ejection amount with which the formed pattern image is the reference pattern image. In this case, for example, in the case where the image density is lower than the reference density, the driving voltage is adjusted in the direction of increasing the ejection amount. In the case where the image density is higher than the reference density, the driving voltage is adjusted in the direction of reducing the ejection amount.

Step S16

Control unit 90 determines whether the adjusted driving voltage of piezoelectric element 58 is smaller than a predetermined voltage. For example, as illustrated in FIG. 6, whether the adjusted driving voltage of piezoelectric element 58 is smaller than a voltage upper limit that is the predetermined voltage is determined.

When the adjusted driving voltage of piezoelectric element 58 is smaller than the predetermined voltage (YES), it is possible to determine that the lifetime of head 55 is not over, and therefore a series of procedures is completed. On the other hand, when the adjusted driving voltage of piezoelectric element 58 is not smaller than the predetermined voltage (NO), that is, when the driving voltage is equal to or greater than the predetermined voltage, there is a possibility that the lifetime of head 55 is over, and therefore the process proceeds to step S17.

Step S17

Control unit 90 (the state change estimation unit) determines whether the numerical value related to the use history of head 55 is not smaller than the predetermined value. For example, control unit 90 stores the number of times of ink ejection and the use period of head 55 in storage unit 94, for example. At this time, in the case where an ink other than gel ink is used, it is desirable to include the number of times of ejection and the use period of the ink other than the gel ink in the number of times of ink ejection and the use period of head 55. In the case where the adjusted driving voltage of piezoelectric element 58 is equal to or greater than the predetermined voltage (NO at step S16), control unit 90 determines the number of times of ink ejection and the use period of head 55 with reference to storage unit 94 at step S17.

In the case where the numerical value related to the use history of head 55 is equal to or greater than the predetermined value (YES), it is possible to determine that the lifetime of head 55 is over, and therefore the process proceeds to step S23. On the other hand, in the case where the numerical value related to the use history of head 55 is not equal to greater than the predetermined value (NO), that is, in the case where the numerical value is smaller than the predetermined value, there is a possibility that the above-described driving voltage is equal to or greater than the predetermined voltage due to the concentration of the gel component of the gel ink, and therefore the process proceeds to step S18.

For example, in the case where the use period of head 55 is equal to or longer than a predetermined use period and/or the number of times of ink ejection is equal to or greater than a predetermined number of times of ejection, it is possible to determine that the lifetime of head 55 is over, and therefore the process proceeds to step S23. On the other hand, in the case where the use period of head 55 is shorter than the predetermined use period and/or the number of times of ink ejection is smaller than the predetermined number of times of ejection, there is a possibility that the above-described driving voltage is equal to or greater than the predetermined voltage due to the concentration of the gel component of the gel ink, and therefore the process proceeds to step S18.

As described above, by determining whether the numerical value related to the use history of head 55 is not smaller than the predetermined value, control unit 90 estimates occurrence of a state change of gel ink. Estimation of occurrence of a state change of gel ink means detection of abnormality of gel ink in carriage 51, and in this case, the following step S18 is performed to refresh (reset) the gel ink in carriage 51.

Step S18

Control unit 90 refreshes (ejects) the gel ink in carriage 51. More specifically, control unit 90 controls head 55 (head driving unit 54) to perform an ejection operation of ejecting the gel ink stored in sub-tank 52 from nozzle 59 of head 55.

At this time, the gel ink ejected from nozzle 59 is collected in the collection tank provided in the maintenance unit, for example.

In this manner, the gel ink in sub-tank 52 is ejected to the outside of carriage 51, and the gel ink is supplied from main tank 41 of ink supply unit 40 to sub-tank 52, and thus, the gel ink in carriage 51 is automatically refreshed (reset).

Step S19

After the gel ink in carriage 51 is refreshed, control unit 90 controls image forming unit 50 to form a pattern image on recording medium M with head 55. A dot pattern is used as the pattern image as described above.

Step S20

By using reading unit 60, control unit 90 reads the pattern image formed on recording medium M and acquires the first reading result (the image density and the dot diameter).

Step S21

On the basis of the acquired first reading result (the image density and the dot diameter), control unit 90 (the driving condition change unit) adjusts the driving condition of head 55 (the driving voltage of piezoelectric element 58).

Step S22

Control unit 90 (the determination unit) determines whether the adjusted driving voltage of piezoelectric element 58 is smaller than the predetermined voltage. For example, as illustrated in FIG. 6, whether the adjusted driving voltage of piezoelectric element 58 is smaller than a voltage upper limit that is the predetermined voltage is determined.

When the adjusted driving voltage of piezoelectric element 58 is smaller than the predetermined voltage (YES), it is possible to determine that the lifetime of head 55 is not over, and therefore a series of procedures is completed. On the other hand, when the adjusted driving voltage of piezoelectric element 58 is not smaller than the predetermined voltage (NO), that is, when the driving voltage is equal to or greater than the predetermined voltage, it is possible to determine that the lifetime of head 55 is over, and therefore the process proceeds to step S23.

Step S23 Control unit 90 causes operation display unit 70 to make a notification of replacement of head 55 in the form of messages and sounds, and terminates the series of procedures. When receiving the notification of replacement of head 55, the operator replaces head 55.

As described above, in the present embodiment, ink-jet printer 100 includes the state change estimation unit and the determination unit. In the case where the driving condition of head 55 satisfies a predetermined condition, the state change estimation unit estimates that a state change of the gel ink in sub-tank 52 has occurred. In addition, the determination unit determines whether the lifetime of head 55 is over in accordance with whether it is estimated that a state change has occurred.

In addition, in the present embodiment, the state change estimation unit estimates occurrence of a state change of gel ink on the basis of the use history of head 55.

According to the present embodiment with the above-described configuration, the lifetime of head 55 is determined after determining whether the concentration of the gel component of the gel ink is changed on the basis of the use history of head 55 even when the optimum voltage of piezoelectric element 58 exceeds the upper limit voltage.

A known ink-jet image forming apparatus as that disclosed in PTL 1 does not consider the state change of gel ink, and therefore may erroneously determine the lifetime of head 55. In the present embodiment, on the other hand, the lifetime of head 55 is determined in consideration of the state change of gel ink (change of the concentration of the gel component), and thus the lifetime of head 55 can be accurately determined. As a result, the notification of the replacement timing of head 55 can be appropriately made such that unnecessary replacement with new head 55 is not performed, and thus cost increase can be prevented.

Modification 1

Ink-jet printer 100 of the present modification is described below with reference to FIG. 1 and FIG. 2. Ink-jet printer 100 of the present modification further includes heating unit 110 as indicated with the long dotted line in FIG. 1 and FIG. 2 in addition to the components of the above-described embodiment.

Heating unit 110, which is disposed upstream of image forming unit 50 in conveyance direction T of recording medium M, heats recording medium M conveyed by conveyance belt 11 to a predetermined temperature. Heating unit 110 is connected to control unit 90 (see FIG. 2), and controlled by control unit 90.

For example, heating unit 110 includes an infrared ray heater and the like, and heats recording medium M to a predetermined temperature by causing the infrared ray heater to generate heat with the power supplied to the infrared ray heater based on a control signal supplied from control unit 90. In the present modification, the predetermined temperature is a temperature equal to or greater than the phase transition temperature of the gel component of the gel ink.

Note that while heating unit 110 is disposed on the top surface side of conveyance belt 11, it is possible to provide the heating unit on the bottom surface side of conveyance belt 11 instead of (or in addition to) the heating unit 110 so as to heat conveyance belt 11, and heat recording medium M.

Figure 8:
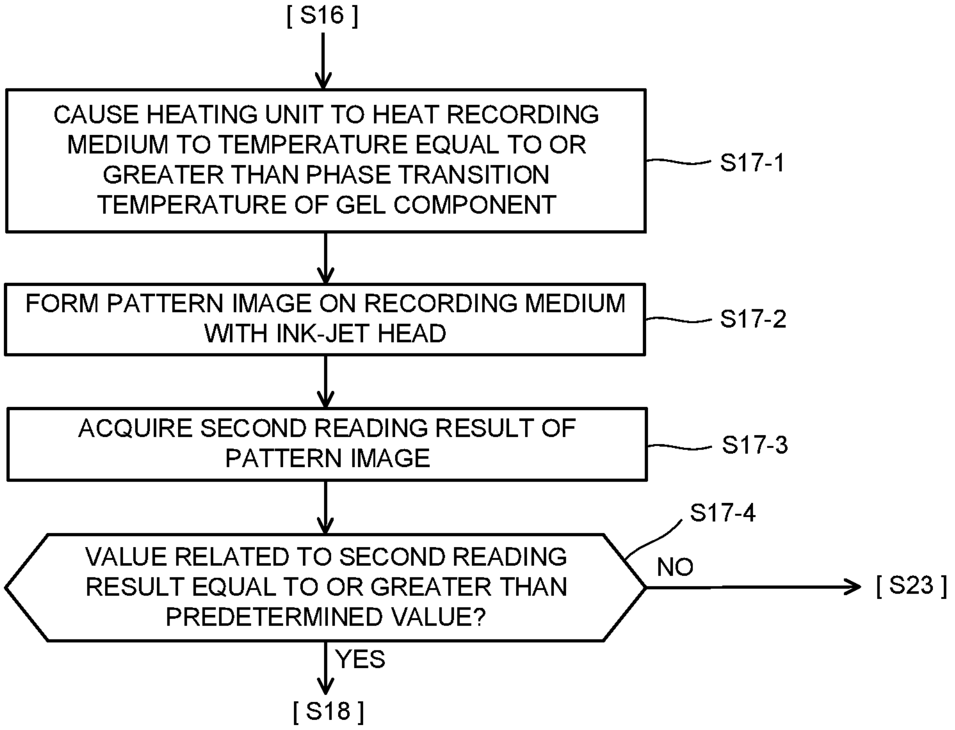
FIG. 8 is a flowchart for describing a modification of the lifetime determination method illustrated in FIG. 7.

The lifetime determination method for head 55 performed by ink-jet printer 100 of the present modification is described below with reference to FIG. 8. FIG. 8 is a flowchart for describing the present modification as a modification of the lifetime determination method illustrated in FIG. 7.

The lifetime determination method of the present modification is the same as the lifetime determination method illustrated in FIG. 7 except for step S17. Therefore, in FIG. 8, the description for the same procedures, steps S11 to S16 and steps S18 to S23, is omitted. In addition, to avoid overlapping description, the description for the same procedures, steps S11 to S16 and steps S18 to S23, are also omitted.

At step S17 illustrated in FIG. 7, control unit 90 (the state change estimation unit) determines whether the numerical value related to the use history of head 55 is not smaller than the predetermined value, and thus occurrence of a state change of gel ink is estimated as described above.

On the other hand, in the present modification, control unit 90 (the state change estimation unit) estimates occurrence of a state change of gel ink on the basis of the second reading result of the pattern image formed on recording medium M heated to a temperature equal to or greater than the phase transition temperature of the gel component. Estimation of occurrence of a state change of gel ink in the present modification is described below with reference to steps S17-1 to S17-4 illustrated in FIG. 8. The lifetime determination method illustrated in FIG. 8 is also performed as a lifetime determination program in control unit 90 as a computer.

Step S17-1

At the above-described step S16, in the case where the adjusted driving voltage of piezoelectric element 58 is equal to or greater than the predetermined voltage, control unit 90 controls heating unit 110 to heat recording medium M to a temperature equal to or greater than the phase transition temperature of the gel component.

Step S17-2

Control unit 90 controls image forming unit 50 to form a pattern image onto recording medium M with head 55. A dot pattern is used as the pattern image as described above.

Step S17-3

By using reading unit 60, control unit 90 reads the pattern image formed on recording medium M, and acquires the second reading result.

Step S17-4

Control unit 90 (the determination unit) determines whether a numerical value related to the second reading result is not smaller than a predetermined value. In the present modification, the numerical value related to the second reading result is the dot diameter of the droplet of the gel ink when the gel ink is ejected under a predetermined driving condition, for example.

Figure 9:
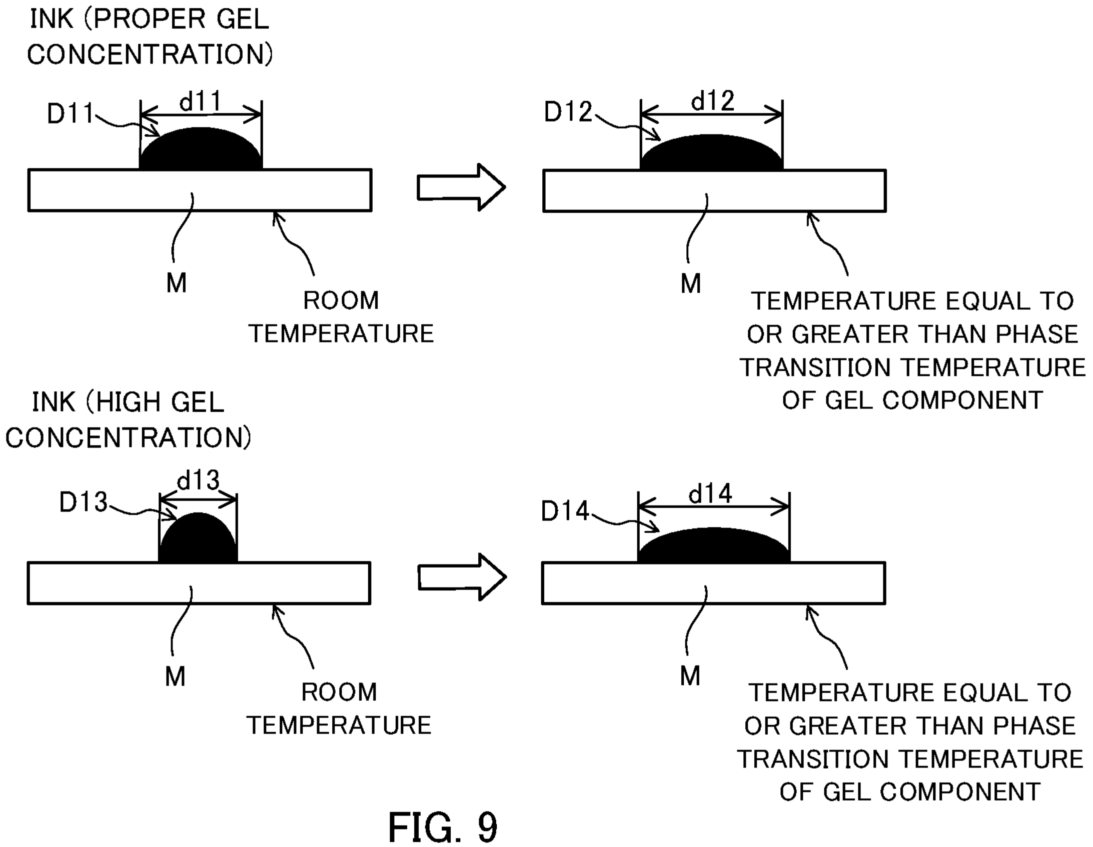
FIG. 9 is a diagram for describing ink drops ejected from the ink-jet head onto a recording medium at room temperature and a recording medium at a temperature equal to or greater than a phase transition temperature, regarding an ink containing a gel component with a proper concentration and an ink containing a gel component with a high concentration.

Here, the numerical value related to the second reading result is described with reference to FIG. 9 with an exemplary dot diameter of a droplet of gel ink. FIG. 9 is a diagram for describing a droplet of gel ink ejected from head 55 onto recording medium M at room temperature and recording medium M at a temperature equal to or greater than the phase transition temperature, regarding gel ink containing a gel ink containing a gel component with a proper concentration and a gel component with a high concentration.

When the gel ink is ejected to recording medium M under a predetermined driving condition, the dot diameter of the droplet of the ejected gel ink differs depending on the concentration of the gel component of the gel ink, the temperature of the recording medium M and the like.

In the case where the concentration of the gel component of the gel ink is a proper concentration and the temperature of the recording medium M is at a room temperature, the dot diameter of droplet D11 of the gel ink when the gel ink is ejected under the predetermined driving condition is d11. In addition, in the case where the concentration of the gel component of the gel ink is a proper concentration and the temperature of the recording medium M is a temperature equal to or greater than the phase transition temperature of the gel component, the dot diameter of droplet D12 of the gel ink when the gel ink is ejected under the predetermined driving condition is d12.

In the case where the temperature of the recording medium M is a temperature equal to or greater than the phase transition temperature of the gel component, droplet D12 of the gel ink spreads to a dot diameter equivalent to that of ink containing no gel component. That is, dot diameter d12 of droplet D12 is greater than dot diameter d11 of droplet D11.

In addition, in the case where the concentration of the gel component of the gel ink is high concentration (>proper concentration) and the temperature of the recording medium M is at a room temperature, the dot diameter of the droplet D13 of the gel ink when the gel ink is ejected under the predetermined driving condition is d13. In addition, in the case where the concentration of the gel component of the gel ink is high concentration and the temperature of the recording medium M is a temperature equal to or greater than the phase transition temperature of the gel component, the dot diameter of droplet D14 of the gel ink when the gel ink is ejected under the predetermined driving condition is d14.

In the case where the concentration of the gel component of gel ink is high concentration, the pinning property is increased in comparison with the case where the concentration of the gel component of the gel ink is a proper concentration, and thus dot diameter d13 of droplet D13 of the gel ink does not spread to the above-described dot diameter d11 of droplet D11 of the gel ink. That is, dot diameter d13 of droplet D13 is smaller than dot diameter d11 of droplet D11.

Then, even in the case where the concentration of the gel component of gel ink is high concentration, droplet D14 of the gel ink spreads to a dot diameter equivalent to that of ink containing no gel component when the temperature of the recording medium M is a temperature equal to or greater than the phase transition temperature of the gel component. That is, dot diameter d14 of droplet D14 is larger than dot diameter d13 of droplet D13, and larger than dot diameter d11 of droplet D11.

On the other hand, in the case where head 55 is degraded (or piezoelectric element 58 is degraded), the actual ejection amount is small even when the gel ink is ejected under the predetermined driving condition. Therefore, even in the case where the temperature of the recording medium M is a temperature equal to or greater than the phase transition temperature of the gel component, the dot diameter of the droplet of the ejected gel ink is not increased unlike droplets D12 and D14 illustrated in FIG. 9. In view of this, in the present modification, the dot diameter of the pattern image acquired at step S17-3 is compared with dot diameter d11 of droplet D11 and the like to estimate occurrence of a state change of gel ink, for example. More specifically, when the dot diameter of the pattern image acquired at step S17-3 is equal to or greater than dot diameter d11 of droplet D11, the occurrence of the state change of gel ink (increase in concentration of the gel component) can be estimated.

Accordingly, in the case where the concentration of the gel component of the gel ink is a proper concentration and the temperature of the recording medium M is at a room temperature, dot diameter d11 of droplet D11 of the gel ink when a predetermined ejection amount of gel ink is ejected is measured in advance. Then, the measured dot diameter d11 is set as a predetermined value, and stored in storage unit 94.

Note that dot diameter d11 of droplet D11 of the gel ink when a different ejection amount of gel ink is ejected may be measured in advance and stored in storage unit 94 as a correspondence relationship table between the ejection amount and dot diameter d11.

When determining whether the numerical value related to the second reading result is not smaller than the predetermined value at the above-described step S17-4, control unit 90 compares the dot diameter of the pattern image acquired at step S17-3 with dot diameter d11 stored in storage unit 94. Control unit 90 determines whether the dot diameter of the pattern image acquired at step S17-3 is equal to or greater than dot diameter d11 stored in storage unit 94.

Then, when the dot diameter of the pattern image acquired at step S17-3 is equal to or greater than dot diameter d11 stored in storage unit 94 (YES), control unit 90 advances the process to step S18. That is, since there is a possibility that the above-described driving voltage is equal to or greater than the predetermined voltage due to the concentration of the gel component of the gel ink, the process proceeds to step S18. On the other hand, in the case where the dot diameter of the pattern image acquired at step S17-3 is not equal to or greater than the dot diameter d11 stored in storage unit 94 (NO), it is possible to determine that the lifetime of head 55 is over, and therefore the process proceeds to step S23.

In the above-described manner, control unit 90 estimates occurrence of a state change of gel ink by determining whether the dot diameter of the pattern image acquired at step S17-3 is not smaller than the dot diameter d11 stored in storage unit 94. The estimation of the occurrence of a state change of gel ink means the detection of abnormality of gel ink in carriage 51, and in this case, the above-described step S18 is performed to refresh (reset) the gel ink in carriage 51.

Note that while the numerical value related to the second reading result is described with an exemplary dot diameter of a droplet of gel ink, the image density may be used as the numerical value related to the second reading result. Even in the case where the image density is used as the numerical value related to the second reading result, the occurrence of a state change of gel ink can be estimated as in the case of dot diameter.

As described above, in the present modification, the state change estimation unit estimates the occurrence of a state change of gel ink on the basis the second reading result of a pattern image formed on recording medium M heated to a temperature equal to or greater than the phase transition temperature of the gel ink with head 55.

According to the present modification having the above-described configuration, the lifetime of head 55 is determined after determining whether the concentration of the gel component of the gel ink is changed on the basis of the second reading result of the pattern image even when the optimum voltage of piezoelectric element 58 exceeds the upper limit voltage. In this manner, since the lifetime of head 55 is determined in consideration of the state change of gel ink (change of the concentration of the gel component), the lifetime of head 55 can be accurately determined. As a result, the notification of the replacement timing of head 55 can be appropriately made such that unnecessary replacement with new head 55 is not performed, and thus cost increase can be prevented.

The above-described embodiments are merely examples for implementing the invention, and the technical scope of the invention should not be interpreted as limited by them. In other words, the invention may be implemented in various forms without departing from its gist or its main features.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:
an ink-jet head including a storage that stores phase transition ink, the ink-jet head forms an image on a recording medium by ejecting the phase transition ink; and
one or more hardware processors, wherein
the one or more hardware processors
change a driving condition of the ink-jet head for a case of ejecting the phase transition ink on a basis of a first reading result of a pattern image formed by the ink-jet head;
estimate occurrence of a state change of the phase transition ink in the storage when the driving condition that is changed satisfies a predetermined condition; and
determine whether a lifetime of the ink-jet head is over in accordance with whether the occurrence of the state change is estimated.

2. The image forming apparatus according to claim 1, wherein the one or more hardware processors estimate the occurrence of the state change of the phase transition ink on a basis of a use history of the ink-jet head.

3. The image forming apparatus according to claim 2, wherein the use history is a use period of the ink-jet head.

4. The image forming apparatus according to claim 2, wherein the use history is a number of times of ink ejection at the ink-jet head.

5. The image forming apparatus according to claim 1, wherein the one or more hardware processors estimate the occurrence of the state change of the phase transition ink on a basis of a second reading result of a pattern image formed with the ink-jet head on the recording medium heated to a temperature equal to or greater than a phase transition temperature of the phase transition ink.

6. The image forming apparatus according to claim 2, wherein the one or more hardware processors estimate the occurrence of the state change of the phase transition ink when a numerical value related to the use history is smaller than a predetermined value.

7. The image forming apparatus according to claim 5, wherein the one or more hardware processors estimate the occurrence of the state change of the phase transition ink when a numerical value related to the second reading result is equal to or greater than a predetermined value.

8. The image forming apparatus according to claim 1, wherein the pattern image is formed as a dot pattern.

9. The image forming apparatus according to claim 8, wherein the reading result is a density of the pattern image.

10. The image forming apparatus according to claim 8, wherein the reading result is a dot diameter of the phase transition ink making up the pattern image.

11. The image forming apparatus according to claim 1, wherein the one or more hardware processors change the driving condition such that the pattern image formed with the ink-jet head is a reference pattern image on a basis of the first reading result.

12. The image forming apparatus according to claim 1,
wherein the ink-jet head includes a nozzle that ejects the phase transition ink, and a piezoelectric element that deforms in accordance with an applied driving voltage and applies a pressure change to the phase transition ink supplied to the nozzle; and
wherein the driving condition is the driving voltage applied to the piezoelectric element.

13. The image forming apparatus according to claim 12, wherein the predetermined condition is that the driving voltage is equal to or greater than a predetermined voltage.

14. The image forming apparatus according to claim 12, wherein the one or more hardware processors control the ink-jet head to perform an ejection operation of ejecting the phase transition ink stored in the storage from the nozzle when it is determined that the lifetime of the ink-jet head is not over.

15. A lifetime determination method comprising:
forming a pattern image on a recording medium by ejecting a phase transition ink from an ink-jet head including a storage that stores the phase transition ink;
changing a driving condition of the ink-jet head for a case of ejecting the phase transition ink on a basis of a first reading result of the pattern image that is formed;

estimating occurrence of a state change of the phase transition ink in the storage when the driving condition that is changed satisfies a predetermined condition; and determining whether a lifetime of the ink-jet head is over in accordance with whether the occurrence of the state change is estimated.

16. Anon-transitory computer-readable recording medium storing a lifetime determination program that causes a computer to perform a process of forming a pattern image on a recording medium by ejecting a phase transition ink from an ink-jet head including a storage that stores the phase transition ink;

a process of changing a driving condition of the ink-jet head for a case of ejecting the phase transition ink on a basis of a first reading result of the pattern image that is formed;

a process of estimating occurrence of a state change of the phase transition ink in the storage when the driving condition that is changed satisfies a predetermined condition; and a process of determining whether a lifetime of the ink-jet head is over in accordance with whether the occurrence of the state change is estimated.

* * * * *